United States Patent
Larsson et al.

(10) Patent No.: US 9,470,340 B2
(45) Date of Patent: Oct. 18, 2016

(54) DEVICE FOR HANDLING A HOSE AND A FUEL DISPENSING UNIT HAVING SUCH A DEVICE

(71) Applicant: Wayne Fueling Systems Sweden AB, Malmo (SE)

(72) Inventors: Bengt I. Larsson, Skivarp (SE); Mattias G. Martensson, Kavlinge (SE); Hanna Helgesson, Dalby (SE)

(73) Assignee: Wayne Fueling Systems LLC, Austin, TX (US)

( * ) Notice: Subject to any disclaimer, the term of this patent is extended or adjusted under 35 U.S.C. 154(b) by 0 days.

(21) Appl. No.: 14/719,485

(22) Filed: May 22, 2015

(65) Prior Publication Data

US 2015/0337991 A1 Nov. 26, 2015

(30) Foreign Application Priority Data

May 26, 2014 (SE) ...................... 1450622

(51) Int. Cl.
*A47G 29/00* (2006.01)
*B05B 15/06* (2006.01)
*F16L 3/12* (2006.01)
*B67D 7/84* (2010.01)
*B67D 7/04* (2010.01)
*B67D 7/40* (2010.01)

(52) U.S. Cl.
CPC .............. *F16L 3/1218* (2013.01); *B67D 7/04* (2013.01); *B67D 7/403* (2013.01); *B67D 7/406* (2013.01); *B67D 7/84* (2013.01)

(58) Field of Classification Search
CPC .......... B67D 7/40; B67D 7/403; B67D 7/84; B67D 7/04; Y10T 137/6932; F16L 3/1218
See application file for complete search history.

(56) References Cited

U.S. PATENT DOCUMENTS

| | | | | |
|---|---|---|---|---|
| 1,468,620 A | * | 9/1923 | Addy | B60S 5/04 137/355.23 |
| 2,002,777 A | * | 5/1935 | Johnson | B65H 75/368 137/234.6 |
| 2,744,788 A | * | 5/1956 | Grise | B67D 7/40 137/355.23 |
| 2,935,080 A | * | 5/1960 | Klimek | F16L 3/01 104/159 |
| 4,131,218 A | | 12/1978 | Tatsuno | |
| 5,775,354 A | * | 7/1998 | Upton | B65H 75/48 137/1 |

(Continued)

FOREIGN PATENT DOCUMENTS

| | | |
|---|---|---|
| EP | 0 369 089 A | 5/1990 |
| EP | 0 647 587 A | 4/1995 |

(Continued)

OTHER PUBLICATIONS

Extended European Search Report mailed on Sep. 28, 2015, for EP Patent Application No. 15168444.6.

*Primary Examiner* — Amy Sterling
(74) *Attorney, Agent, or Firm* — Mintz Levin Cohn Ferris Glovsky and Popeo, P.C.

(57) ABSTRACT

Embodiments of the invention are based on the idea of providing a device for handling a hose and a fuel dispensing unit having such a device. This is basically achieved by an elastic element that is adapted to extend within a frame element and to be guided by a guiding element, and by a hose guiding member which is movable away from said frame element allowing said hose to be pulled from an idle position to an operating position when said elastic element is extended.

24 Claims, 3 Drawing Sheets

(56) References Cited

U.S. PATENT DOCUMENTS

| | | | | |
|---|---|---|---|---|
| 6,328,060 B1 * | 12/2001 | Smith | ............... | B67D 7/40 137/355.2 |
| 6,334,457 B1 * | 1/2002 | Baker, IV | ............ | B67D 7/40 137/1 |
| 8,230,876 B2 * | 7/2012 | Gunnarsson | ......... | B67D 7/40 137/355.23 |

FOREIGN PATENT DOCUMENTS

| | | |
|---|---|---|
| EP | 2 006 245 A1 | 12/2008 |
| EP | 2 163 511 A1 | 3/2010 |
| GB | 442 556 A | 2/1936 |
| JP | S50148918 A | 11/1975 |
| JP | S5744096 A | 3/1982 |
| WO | WO 0015542 | 3/2000 |

* cited by examiner

DEVICE FOR HANDLING A HOSE AND A FUEL DISPENSING UNIT HAVING SUCH A DEVICE

CROSS REFERENCE TO RELATED APPLICATIONS

This application is a national application of Swedish Patent Application No. 1450622-4 filed on May 26, 2014 and entitled "Device for Handling a Hose and a Fuel Dispensing Unit Having Such a Device," the entire contents of which are incorporated herein by reference.

TECHNICAL FIELD

The field of the invention generally relates to the field of fuel dispensing units and more particularly to a device for handling a hose.

BACKGROUND

A fuel dispensing unit, such as a petrol pump typically comprises a pump part standing on the ground, a display part positioned above the pump part and showing the chosen type of petrol, cash readout, volume readout etc., and a column or frame to which one or more petrol hoses are connected.

When the tank of a vehicle is to be filled up, the driver parks the vehicle beside the petrol pump and opens the cover or cap of the petrol tank. The driver then selects the desired type of petrol and places the pump nozzle in the inlet of the vehicle's petrol tank and puts in the desired volume of petrol.

A difficulty that may arise in connection with filling-up is that the hose does not reach to the vehicle if parked a distance from the petrol pump. The reason why the vehicle has not been parked sufficiently close to the pump may be difficulty in maneuvering owing to a limited space round the petrol pump. To allow the hose to reach the vehicle, it is usually necessary for the driver to park his vehicle so that the side of the vehicle where the filler cap is positioned faces the petrol pump. It is not always known to a driver of an unfamiliar vehicle whether the filler cap is positioned on the left or right side. This may result in the driver by mistake parking the vehicle on the wrong side of the pump and thus not being able to fill up the tank without moving the vehicle to the other side of the petrol pump since the hose does not reach all the way round the vehicle.

One way of facilitating access to the petrol pump is to provide it with a longer hose. This may, however, cause problems since a longer hose may tend to land on the ground when not used and thus get stuck in or be damaged by passing cars or other vehicles. To prevent this, the column or frame may be provided with some kind of returning mechanism for the hose.

A problem common for the hose returning devices described above is their size, or their extension within the fuel dispensing unit, which results in bulky and complicated structures.

SUMMARY

Embodiments of the invention include a device for handling a hose and a fuel dispensing having such a device.

Such embodiments generally aim at eliminating or at least reducing the problems discussed above as well as other problems known in the art.

In one embodiment, a device for handling a hose comprises a frame element, said frame element being hollow and including a guiding element, a hose guiding means arranged outside of said frame element and adapted to guide said hose, and an elastic element which is attached to a fixed point in relation to said frame element at one end and to said hose guiding means at the other end. The device is characterized in that said elastic element is adapted to extend within said frame element and to be guided by said guiding element, and that said hose guiding means is movable away from said frame element allowing said hose to be pulled from an idle position to an operating position when said elastic element is extended. This is advantageous in that a robust and space-saving device is provided, which enables a smooth and flexible handling of the hose. Further, due to the design of the frame element and the guiding element included therein, the risk of entangling with the hose is eliminated.

According to another aspect a fuel dispensing unit comprises such a device for handling a hose.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

The term "vertically" means the vertical direction in relation to the device when in an upright position.

The term "horizontally" means the horizontal direction in relation to the device when in an upright position.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals will be used for similar elements, wherein.

DETAILED DESCRIPTION

Figure 1:
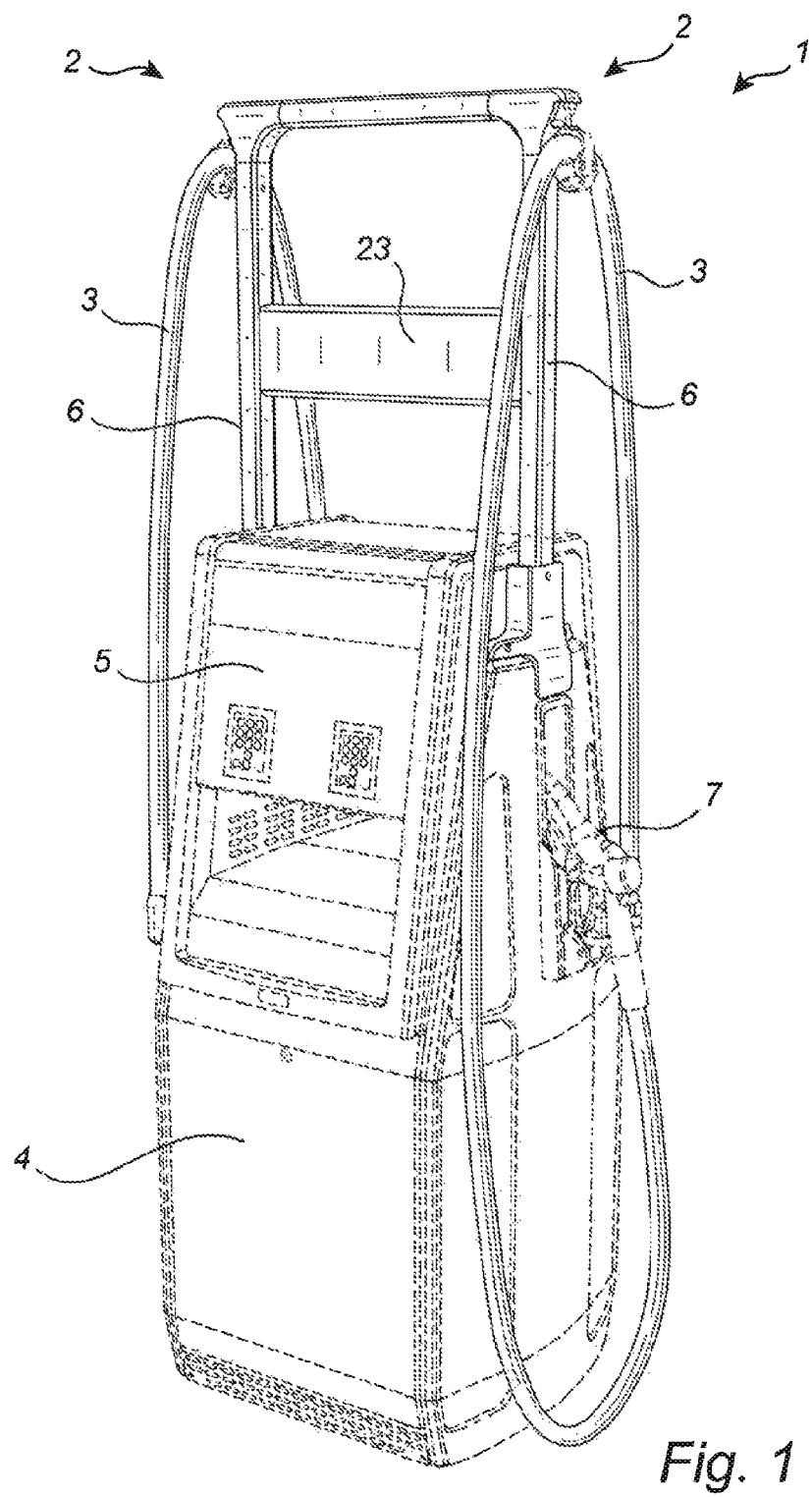
FIG. 1 is a perspective view of a fuel dispensing unit having a device according to a first exemplary embodiment of the invention.

FIG. 1 illustrates a fuel dispensing unit 1 having a device 2 for handling a hose 3 provided on each side of the fuel dispensing unit 1. The fuel dispensing unit 1 has an electrical cabinet 4 containing all the electronics for the fuel dispensing unit 1, a hydraulic cabinet 5 containing fuel dispensing means (not shown), e.g. fuel metering means, valves, vapour recovery system etc, and a column 6 (on each side of the fuel dispensing unit 1) extending upwards vertically above the electrical cabinet 5. The fuel dispensing unit 1 is connected to an underground reservoir (not shown) containing fuel.

When filling up the tank of a motor vehicle, the fuel is pumped from the underground reservoir by means of a pump (not shown) which is located in the hydraulic cabinet 4, and from there to a hose connection (not shown) and out to a nozzle 7 via the hose 3.

Figure 2A:
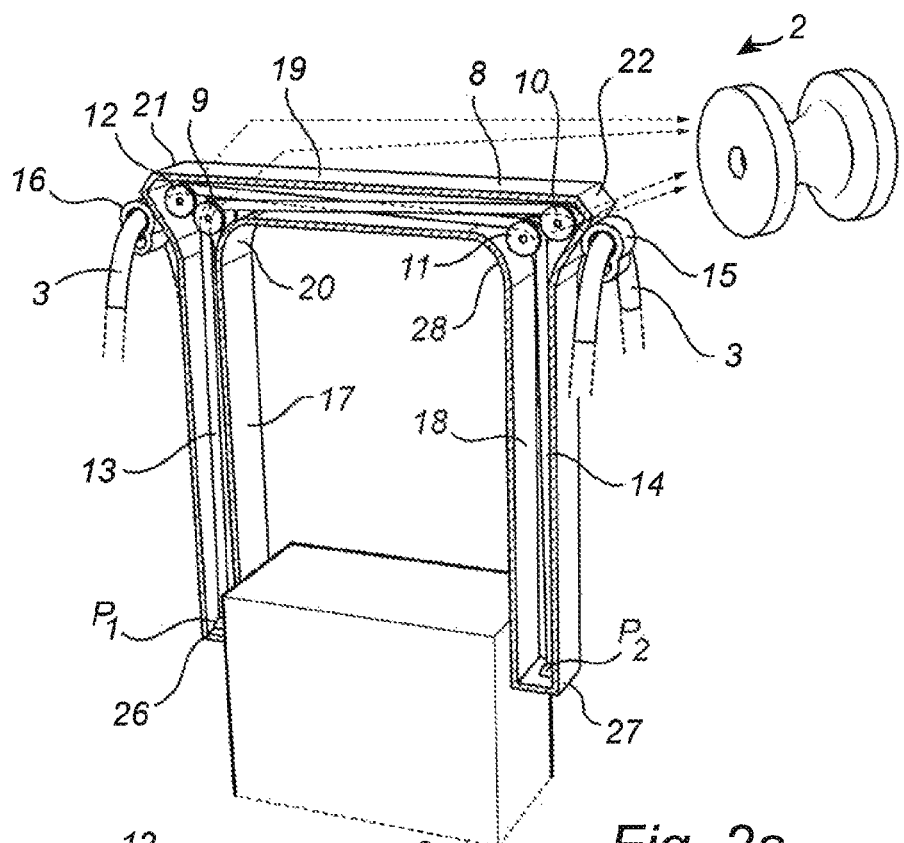
FIG. 2a is a perspective view the device when the hose is in an idle position.

In FIG. 2*a*, the device 2 is illustrated when the hose 3 (both of the hoses 3) is in an idle position. In this exemplary embodiment, the device 2 is arranged to handle two hoses 3. The device 2 comprises a frame element 8 which is hollow and includes a first, second, third and fourth guiding element 9, 10, 11, 12. Each guiding element comprises a roller which is rotatable around an axis. The device 2 further comprises a first and second elastic element 13, 14, and a first and second hose guiding means 15, 16. The frame element 8 comprises first and second side parts 17, 18 which are constituted the columns 6 provided on each side of the fuel dispensing unit 1, and a top part 19. The top part 19 extends in a horizontal direction and connects the first and second side parts 17, 18 at an upper end 20, 28 of the first and second side parts 17, 18, respectively. The frame element 8 further comprises a support element 23 arranged horizontally between the first and second side parts. The first elastic element 13 is attached to a first fixed point $P_1$ at one end and to the first hose guiding means 15 at the other end. The first elastic element 13 is adapted to extend from the first fixed point $P_1$, upwards vertically through the first side part 17 to a first outer end 21 of the top part 19, over the first guiding element 9 which is arranged at the first outer end 21 of the top part 19, horizontally through the top part 19 to a second outer end 22 of the top part 19, over the second guiding element 10 which is arranged at the second outer end 22 of the top part 19, out of the frame element 8 and to the first hose guiding means 15. The first hose guiding means 15 is thereby movable away from the frame element 8 allowing the hose 3 to be pulled from an idle position to an operating position when the first elastic element 13 is extended. The first hose guiding means 15 is adapted to enclose the hose 3 and is arranged adjacent to the second outer end 22 of said top part 19 when the hose 3 is in said idle position. Thus, the hose 3 is not accommodated in the frame element 8 and does not form part of the device 2. Instead, the hose 3 is held in place on the side of the fuel dispensing unit 1 by means of the hose guiding means 15. The second elastic element 14 is attached to a second fixed point $P_2$ at one end and to the second hose guiding means 16 at the other end. The second elastic element 14 is adapted to extend from the second fixed point $P_2$, upwards vertically through the second side part 18 to the second outer end 22 of the top part 19, over the third guiding element 11 which is arranged at the second outer end 22 of the top part 19, horizontally through the top part 19 to a first outer end 21 of the top part 19, over the fourth guiding element 12 which is arranged at the first outer end 21 of the top part 19, out of the frame element 8 and to the second hose guiding means 16. The second hose guiding means 16 is thereby movable away from the frame element 8 allowing the hose 3 to be pulled from an idle position to an operating position when the second elastic element 14 is extended. The second hose guiding means 16 is adapted to enclose the hose 3 and is arranged adjacent to the first outer end 21 of said top part 19 when the hose 3 is in said idle position.

Figure 2B:
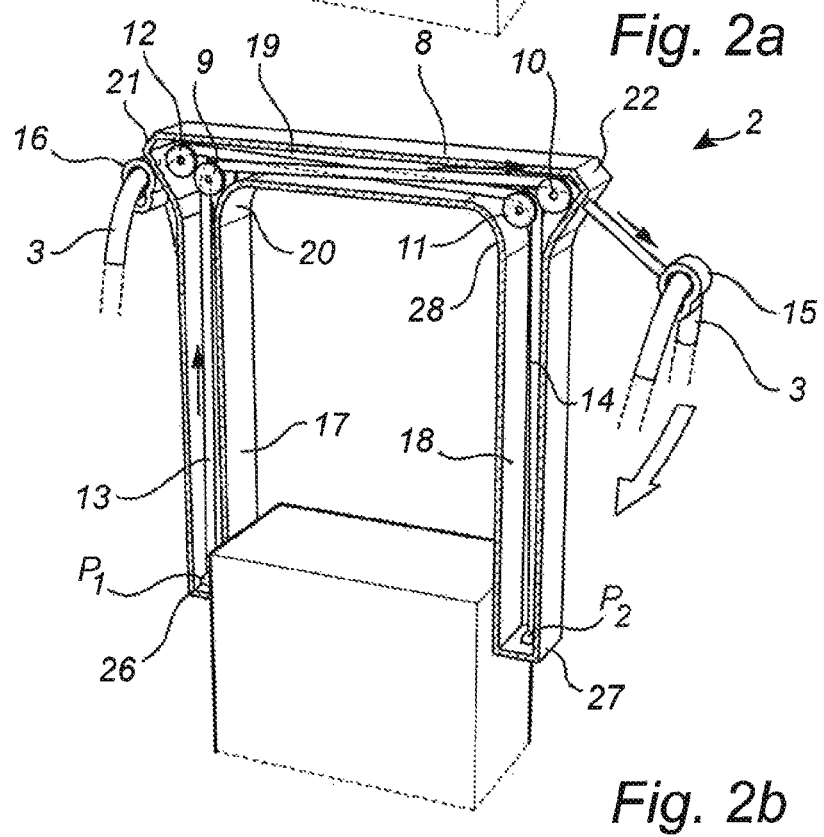
FIG. 2b is a perspective view the device when the hose is in an operating position.

In FIG. 2*b*, the device 2 is illustrated when one of the hoses 3 (on the left side of the fuel dispensing unit 1) is in an operating position.

Figure 3:
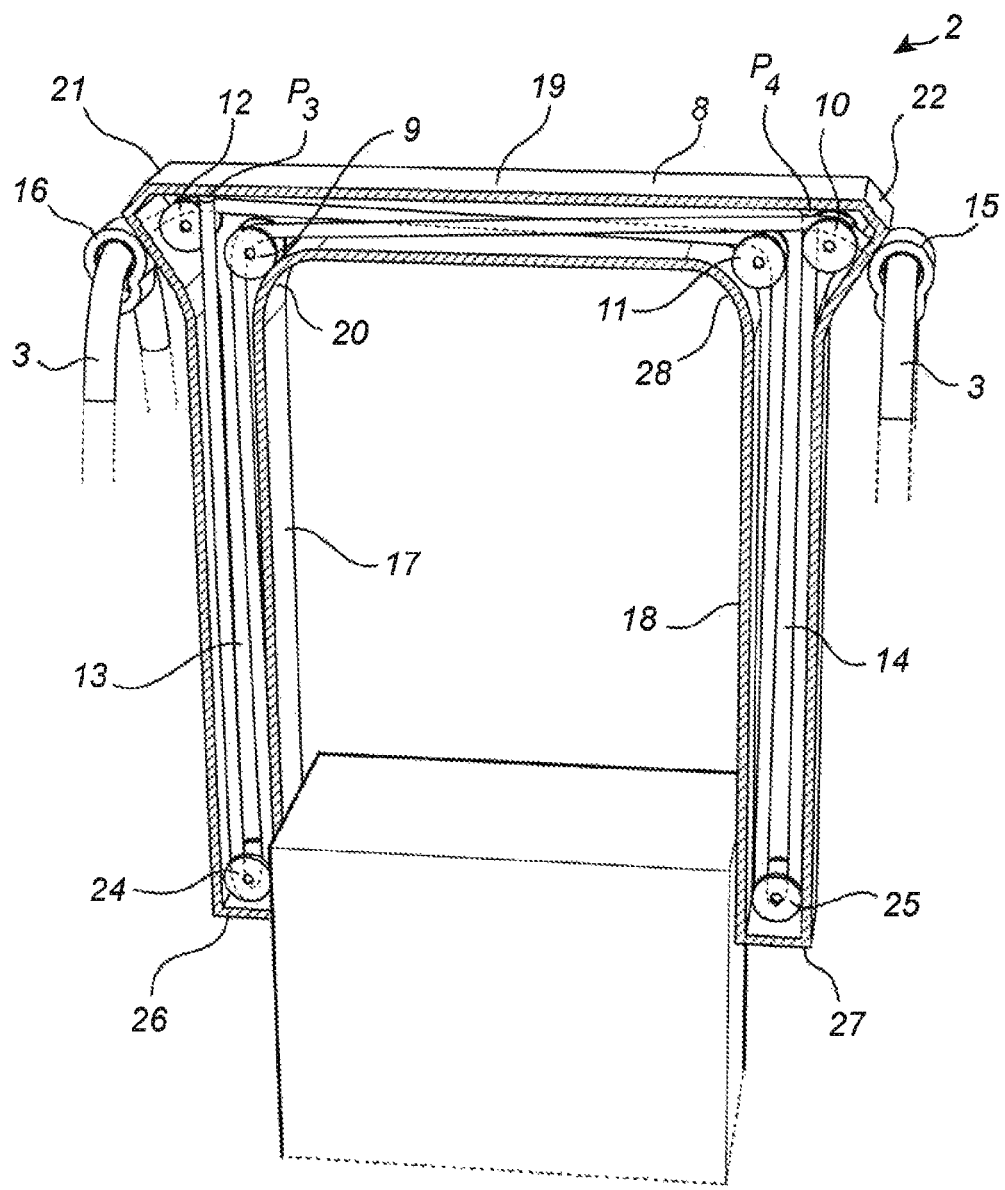
FIG. 3 is a perspective view of a fuel dispensing unit having a device according to a second exemplary embodiment of the invention.

FIG. 3 illustrates the device 2 according to a second embodiment of the invention. In this embodiment, the device 2 is arranged to handle two hoses 3 and the frame element 8 further comprises a fifth and a sixth guiding element 24, 25. The first elastic element 13 is attached to a third fixed point $P_3$ (located at the first outer 21 end of the top part 19) at one end and to the first hose guiding means 15 at the other end. The first elastic element 13 is adapted to extend from the third fixed point $P_3$, downwards vertically through the first side part 17 to a lower end 26 of the first side part 17, below the fifth guiding element 24 arranged at the lower end 26 of the first side part 14, upwards vertically through the first side part 17 to the first outer end 21 of the top part 19, over the first guiding element 9 arranged at the first outer end 21 of the top part 19, horizontally through the top part 19 to the second outer end 22 of the top part 19, over the second guiding element 10 arranged at the second outer end 22 of the top part 19, out of the frame element 8 and to the first hose guiding means 15. The second elastic element 14 is attached to a fourth fixed point $P_4$ (located at the second outer 22 end of the top part 19) at one end and to the second hose guiding means 16 at the other end. The second elastic element 14 is adapted to extend from the fourth fixed point $P_4$, downwards vertically through the second side part 18 to a lower end 27 of the second side part 18, below the sixth guiding element 25 arranged at the lower end 27 of the second side part 18, upwards vertically through the second side part 18 to the second outer end 22 of the top part 19, over the third guiding element 11 arranged at the second outer end 22 of the top part 19, horizontally through the top part 19 to the first outer end 21 of the top part 19, over the fourth guiding element 12 arranged at the first outer end 21 of the top part 19, out of the frame element 8 and to the second hose guiding means 16.

When the hose 3 is to be used to refuel a vehicle, the hose 3 is merely pulled by a user. The hose guiding means 15, 16 will follow the hose 3 and move away from the frame element 8 to an operating position, thereby extending the elastic element 13, 14 attached to the same. When the vehicle has been refueled and the user releases the pressure applied to the hose 3, the elastic element 13, 14 will pull the hose guiding means 15, 16 as well as the hose 3 back to the idle position.

The skilled person realizes that a number of modifications of the embodiments described herein are possible without departing from the scope of the invention, which is defined in the appended claims.

For instance, elastic element can be made of any suitable material, such as a rubber band, a spring wire, wire connected to a spring, and a roll of spring-loaded coiled wire.

The hose guiding means can be of any suitable shape and size. In one embodiment of the hose guiding means, the hose can slide freely through the same during use.

The guiding elements can be of any suitable shape and size and are not limited to rollers. The guiding element can, for example, be made of low friction materials and be shaped as a curved groove in which the hose can slide.

The fixed point can be located at any suitable location, both within and outside of the device as well as the fuel dispensing unit.

The invention claimed is:
1. A device for handling a hose, said device comprising:
 a frame element, said frame element being hollow and including
  a guiding element,
  a hose guiding member arranged outside of said frame element and adapted to guide a hose, and
  an elastic element which is attached to a fixed point in relation to said frame element at one end and to said hose guiding member at the other end, wherein the elastic element has a first portion extending vertically within the frame and a second portion extending horizontally within the frame, and the elastic element is guided by said guiding element, and the hose guiding member is movable away from said frame element allowing a hose extending through the hose guiding member to be pulled from an idle position to an operating position when said elastic element is extended.

2. The device of claim 1, wherein said frame element comprises a first side part and a second side part extending in a substantially vertical direction, and a top part extending in a substantially horizontal direction and which connects said first and second side parts at an upper end of said first and second side parts, respectively.

3. The device of claim 2, wherein the guiding element comprises a first guiding element and said frame element includes a second guiding element, and the first portion of the elastic element extends from said fixed point, upwards vertically through said first side part to a first outer end of said top part, over said first guiding element arranged at said first outer end of said top part, and the second portion of the elastic element extends horizontally through said top part to a second outer end of said top part, over said second guiding element arranged at said second outer end of said top part, out of said frame element and to said hose guiding member.

4. The device of claim 1, further comprising
a second hose guiding member arranged outside of said frame element and adapted to guide a second hose, and
a second elastic element which is attached to a second fixed point in relation to said frame element at one end and to said second hose guiding member at the other end,
wherein said second elastic element extends within said frame element and is guided by a third guiding element, and said second hose guiding member is movable away from said frame element allowing said second hose to be pulled from an idle position to an operating position when said second elastic element is extended.

5. The device of claim 4, wherein said frame element includes a fourth guiding element, and said second elastic element extends from a third fixed point, upwards vertically through the second side part to said second outer end of said top part, over said third guiding element arranged at said second outer end of said top part, horizontally through said top part to the first outer end of said top part, over said fourth guiding element arranged at said first outer end of said top part, out of said frame element and to said second hose guiding member.

6. The device of claim 5, wherein said frame element includes a fifth guiding element, and said elastic element extends from a third fixed point at said first outer end of said top part, downwards vertically through said first side part to a lower end of said first side part, below said fifth guiding element arranged at said lower end of said first side part, upwards vertically through said first side part to said first outer end of said top part, over said guiding element arranged at said first outer end of said top part, horizontally through said top part to said second outer end of said top part, over said second guiding element arranged at said second outer end of said top part, out of said frame element and to said hose guiding member.

7. The device of claim 6, wherein said frame element further includes a sixth guiding element, and said second elastic element extends from a fourth fixed point at said second outer end of said top part, downwards vertically through said second side part to a lower end of said second side part, below said sixth guiding element arranged at said lower end of said second side part, upwards vertically through said second side part to said second outer end of said top part, over said third guiding element arranged at said second outer end of said top part, horizontally through said top part to said first outer end of said top part, over said fourth guiding element arranged at said first outer end of said top part, out of said frame element and to said second hose guiding member.

8. The device of claim 1, wherein said elastic element is selected from the group consisting of a rubber band, a spring wire, wire connected to a spring, and a roll of spring-loaded coiled wire.

9. The device of claim 1, wherein said guiding element comprises a roller rotatable on an axis.

10. The device of claim 1, wherein said hose guiding member is arranged adjacent to said second outer end of said top part when said hose is in said idle position.

11. The device of claim 4, wherein said second hose guiding member is arranged adjacent to said first outer end of said top part when said second hose is in said idle position.

12. The device of claim 1, wherein said hose guiding member is adapted to enclose said hose.

13. The device of claim 4, wherein said second hose guiding member is adapted to enclose said second hose.

14. The device of claim 1, wherein said frame element further comprises a support element arranged horizontally between said first and second side parts.

15. A device for handling a hose, comprising:
a hollow frame having a horizontally extending support and first and second vertically extending side parts;
a hose guide movably coupled to the frame and configured to support a hose; and
an elastic element extending through at least one of the first and second side parts and extending through the support, the elastic element having a first end coupled to the frame at a fixed point and a second end extending from the frame and coupled to the hose guide such that the elastic element allows movement of the hose guide away from the frame allowing a hose support by the hose guide to be pulled from an idle position to an operating position.

16. The device of claim 15, wherein the elastic element is directly connected to the frame at a fixed point.

17. The device of claim 15, wherein the elastic element is directly connected to one of the first and second side parts of the frame.

18. The device of claim 15, further comprising a guiding element disposed within the frame and having the elastic element positioned therearound such that the guiding element guides the elastic element when the hose guide is moved away from the frame.

19. The device of claim 15, further comprising first and second guiding elements disposed within the frame and having the elastic element positioned therearound such that the first and second guiding elements guide the elastic element when the hose guide is moved away from the frame.

20. The device of claim 19, wherein the first guiding element is disposed within the support of the frame at a first end of the support adjacent to the first side part of the frame, and the second guiding element is disposed within the support adjacent to the second side part of the frame.

21. The device of claim 20, wherein the elastic element is connected at a first end at a fixed point to the first side part of the frame and extends through the first side part of the frame, around the first guiding element, through the support, around the second guiding element, and is connected at a second end to the hose guide.

22. A device for handling a hose, comprising:
   a hollow frame;
   a hose guide movably coupled to the frame and configured to support a hose; and
   an elastic element extending through the frame, the elastic element having a first end directly mated to the frame at a fixed point and having a second end extending from the frame and coupled to the hose guide such that the elastic element allows movement of the hose guide away from the frame allowing a hose support by the hose guide to be pulled from an idle position to an operating position, and the elastic element including a first portion extending vertically and a second portion extending horizontally.

23. The device of claim 22, wherein the frame includes a horizontally extending support and vertically extending first and second side parts coupled to the support, the elastic element extending through one of the first and second side parts and through the support.

24. The device of claim 22, further comprising at least one guide element disposed within the frame and having the elastic element extending therearound such that the guide element guides the elastic element when the hose guide is moved away from the frame.

* * * * *